Nov. 8, 1927.   1,648,076
L. D. STRIPLING
AXLE FOR TRACTORS
Original Filed March 20. 1926
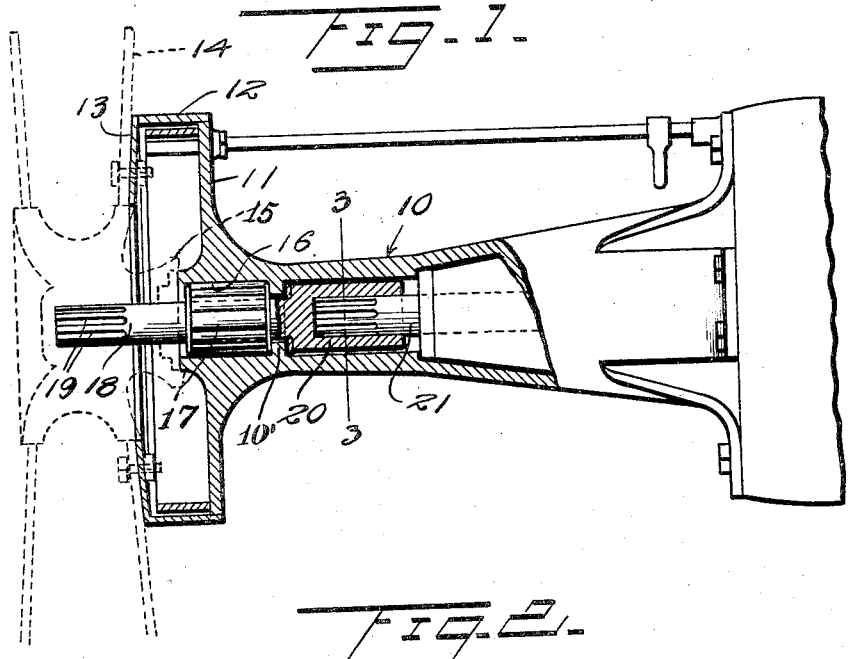
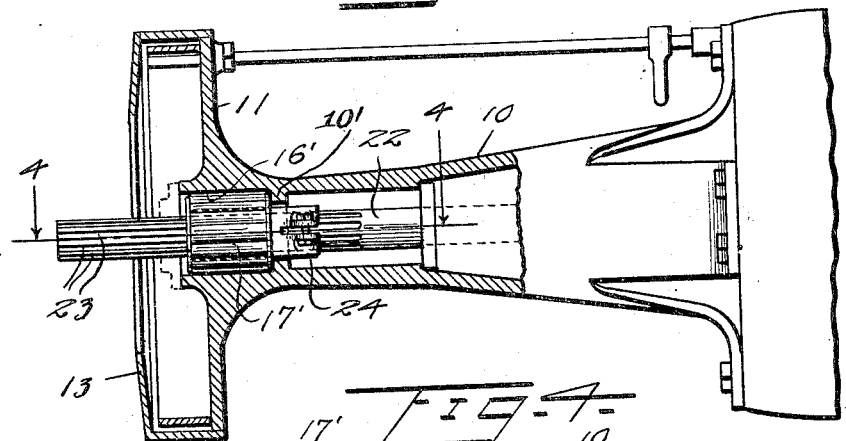
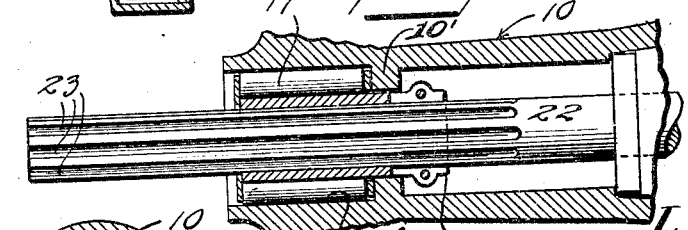
Inventor
L.D. Stripling
By
Attorney Patented Nov. 8, 1927.

1,648,076

UNITED STATES PATENT OFFICE.

LESLIE D. STRIPLING, OF BIG SPRINGS, TEXAS.

AXLE FOR TRACTORS.

Application filed March 20, 1926, Serial No. 96,271. Renewed August 24, 1927.

This invention relates to new and useful improvements in tractors, and particularly to the rear axles thereof.

One object is to provide an axle which is arranged for extension, whereby to increase the width of the thread of the rear end of the tractor.

Another object is to provide an extension axle section which is capable of use in connection with the axle already on the tractor, whereby to increase the width of the rear end of the tractor, and space the rear wheels a greater distance apart.

Other objects and advantages will be apparent from the following description when taken in connection with the accompanying drawing.

In the drawing:

Figure 1 is a vertical longitudinal central sectional view through the rear portion of a tractor, equipped with the improved extension axle.

Figure 2 is a similar sectional view, of a modification of the device, wherein the extension axle is formed in one piece and equipped with a novel bearing supporting and engaging means.

Figure 3 is an enlarged vertical transverse sectional view on the line 3—3 of Figure 1.

Figure 4 is an enlarged longitudinal detail sectional view on the line 4—4 of Figure 2.

Referring particularly to the accompanying drawing, 10 represents a portion of the axle housing of the rear end of a tractor, in connection with which the present invention is adapted for use. The outer, or smaller end of the housing 10 is formed with a peripherally extending flange 11, on the outer edge of which is engaged the drum ring 12. To the outer edge of this ring is secured the disk 13 which is properly bolted to the wheel 14. Formed in the bore of the axle housing 10, adjacent the flange 11, is a circular rib 10', which defines, in connection with the hub 15, of the wheel, a chamber 16, within which are arranged the circular series of roller bearings 17. Disposed centrally within the series of bearings 17 is the extension axle section 18, the outer end of which is formed with the longitudinal grooves 19 for engagement in the correspondingly formed bore of the hub of the wheel. On the other end of the axle section 18 there is formed an enlarged socketed portion 20, within which is splined the adjacent end of the axle section 21. By this arrangement the wheels of the rear end of the tractor are spaced a greater distance apart than in the ordinary tractor. Furthermore, this extension axle section may be applied to tractors now in use, with the addition of the longer housing 10. The housing is, of necessity, made somewhat longer to accommodate this extra length of axle.

In lieu of the section 18, the main axle may be made considerably longer, whereby such axle is formed of one piece, as shown in Figure 2, of the drawing. In the use of this longer axle, which is shown at 22, in Figure 2, that portion which extends through the bearing chamber 16', being longitudinally ribbed or fluted, as at 23, to fit within the correspondingly formed sleeve 24. This sleeve is disposed in the bearing chamber and turns within the center of the series of roller bearings 17'. Thus the ordinary tractor may be modified to increase the width of the tractor without great increase in cost of manufacture.

What is claimed is:

1. The combination with the rear axle of a tractor, of a housing enclosing the axle and extending beyond the outer end thereof, and an extension axle section telescoped onto the outer end of the said rear axle and extending beyond said housing for connection with a wheel.

2. The combination with the rear axle of a tractor, of a housing for the axle extending beyond the outer end thereof and having a bearing containing chamber, an extension axle section having an enlarged terminally socketed member on its end receiving the outer end of the said axle and projecting through said bearing chamber.

3. The combination with the rear axle of a tractor, of a housing therefor provided with a bearing chamber, an extension axle connected with the rear axle and extending through said chamber for connection with a wheel, and bearing supporting means surrounding the extension axle and disposed within the bearing chamber.

In testimony whereof, I affix my signature.

LESLIE D. STRIPLING.